US012583583B2

(12) United States Patent
Stevens

(10) Patent No.: US 12,583,583 B2
(45) Date of Patent: Mar. 24, 2026

(54) HIGH-ALTITUDE PSEUDO SATELLITE CONTROL

(71) Applicant: Voltitude Ltd, London (GB)

(72) Inventor: Paul Stevens, London (GB)

(73) Assignee: Voltitude Ltd, London (GB)

( * ) Notice: Subject to any disclaimer, the term of this patent is extended or adjusted under 35 U.S.C. 154(b) by 201 days.

(21) Appl. No.: 17/560,368

(22) Filed: Dec. 23, 2021

(65) Prior Publication Data

US 2022/0396357 A1    Dec. 15, 2022

(30) Foreign Application Priority Data

Dec. 24, 2020    (GB) ..................................... 2020592

(51) Int. Cl.
B64C 39/04        (2006.01)
B64C 9/32        (2006.01)
(Continued)

(52) U.S. Cl.
CPC .............. B64C 39/04 (2013.01); B64C 9/323 (2013.01); B64C 13/16 (2013.01); B64U 10/25 (2023.01);
(Continued)

(58) Field of Classification Search
CPC .. B64C 39/10; B64C 3/58; B64C 5/08; B64C 5/10; B64C 9/08; B64C 13/16;
(Continued)

(56) References Cited

U.S. PATENT DOCUMENTS

| | | | | | |
|---|---|---|---|---|---|
| 4,615,497 | A | * | 10/1986 | Seeler | B64C 13/16 |
| | | | | | 244/76 R |
| 5,810,284 | A | * | 9/1998 | Hibbs | B64D 27/24 |
| | | | | | 244/45 R |

(Continued)

FOREIGN PATENT DOCUMENTS

| | | | | | |
|---|---|---|---|---|---|
| EP | 2281747 | A2 | * | 2/2011 | B64C 23/065 |
| EP | 3578457 | A1 | * | 12/2019 | B64C 13/16 |

(Continued)

OTHER PUBLICATIONS

American Institute of Aeronautics and Astronautics (Year: 2020).*

(Continued)

*Primary Examiner* — Richard Green
*Assistant Examiner* — Nevena Aleksic
(74) *Attorney, Agent, or Firm* — MH2 Technology Law Group LLP

(57)    ABSTRACT
A High Altitude Pseudo Satellite (HAPS) aircraft is disclosed for maintaining the span-wise shape of the wing and maintaining total bending and torsion loads. The aircraft including at least one aeroelastic span loaded fixed wing having an aspect ratio greater than 15 and wing loading less than 6 kg/m$^2$, the wing having a plurality of spoilers distributed across the span of the wing and each spoiler being chordwise located adjacent the center of pressure of the wing. The HAPS aircraft further includes a control system for controlling the spoilers, and sensors which determine the amount of lift at points or regions along the wing span, the pitch and roll at points or regions along the wing span, the bending and torsional strain at points or regions along the wing span, or the absolute speed and roll and pitch angle of the wing.

15 Claims, 6 Drawing Sheets

(51) Int. Cl.

| | | |
|---|---|---|
| *B64C 13/16* | (2006.01) | |
| *B64U 10/25* | (2023.01) | |
| *B64U 30/10* | (2023.01) | |
| *B64U 50/31* | (2023.01) | |
| *B64U 101/20* | (2023.01) | |

(52) U.S. Cl.
CPC .............. *B64U 30/10* (2023.01); *B64U 50/31* (2023.01); *B64U 2101/20* (2023.01)

(58) Field of Classification Search
CPC ........ B64C 9/146; B64C 9/323; B64C 39/04; B64C 9/32; B64U 2101/20; B64U 10/25; B64U 50/31; B64U 2101/31; B64U 2101/35; B64U 10/13; B64U 30/10; B64U 50/19; B64U 50/34
See application file for complete search history.

(56) References Cited

U.S. PATENT DOCUMENTS

| | | | |
|---|---|---|---|
| 8,333,348 B1 * | 12/2012 | Miller | .................... B64U 30/12 244/199.4 |
| 9,751,614 B1 * | 9/2017 | Nguyen | .................. B64C 15/02 |
| 2004/0079835 A1 | 4/2004 | Volk | |
| 2008/0001028 A1 * | 1/2008 | Kendall | ................. B64D 27/24 244/75.1 |
| 2009/0121074 A1 * | 5/2009 | Vaneck | ................... B64C 3/185 244/58 |
| 2019/0375493 A1 * | 12/2019 | Schwindt | ........... B64D 45/0005 |
| 2021/0155338 A1 * | 5/2021 | Vijgen | ..................... B64C 9/04 |

FOREIGN PATENT DOCUMENTS

| | | | |
|---|---|---|---|
| EP | 3647185 A1 | 5/2020 | |
| WO | WO-2018156335 A2 * | 8/2018 | ............ B64C 13/18 |

OTHER PUBLICATIONS

Search Report in corresponding GB Application No. 2020592.8 dated Jun. 22, 2021, 2 pages.

Anderson, J. "Fundamentals of aerodynamics." 4th Edition, Section 4.7, McGraw-Hill (1984), 16 pages.

Noth, A., "Design of Solar Powered Airplanes for Continuous Flight," Diss. Eth No. 18010, A dissertation submitted to Eth Zürich for the degree of Doctor of Technical Sciences, Sep. 2008, 196 pages.

Anderson, J. "Fundamentals of aerodynamics." 4th Edition, Section 4.7, McGraw-Hill (1984), 3 pages.

* cited by examiner

| Flight Envelope Protection – Spanwise Shape Control |
|---|
| Measurement: Spanwise shape determined from distributed system of pitch and roll sensors and/or strain gauges |
| Comparison: A comparison with optimal shape values is made to determine the shape error profile across the span, this is compared to the flight envelope protection system activation thresholds |
| Actuation: If shape error profile exceeds trigger threshold, spoilers are actuated using elements of a proportional–integral–derivative controller system to reduce shape error profile across span and continue to do so while above trigger threshold |

Fig 5.

| Flight Envelope Protection – Speed or Roll Control |
|---|
| Measurement: Absolute speed and roll is measured or determined from system of roll and/or yaw sensors, angle of attack and/or airspeed sensors |
| Comparison: A comparison of measured states with flight control system speed and roll demands is used to determine speed and roll error, these are compared to flight envelope protection system activation thresholds |
| Actuation: If speed or roll errors exceed trigger threshold, spoilers are actuated using elements of a proportional–integral–derivative controller system to reduce speed and/or roll error and continue to do so while above trigger threshold |

Fig 6

HIGH-ALTITUDE PSEUDO SATELLITE CONTROL

CROSS-REFERENCE TO RELATED APPLICATIONS

The present application claims the benefit of priority of UK Patent Application No. GB2020592.8, filed Dec. 24, 2020, the disclosure of which is incorporated by reference herein in its entirety.

The present specification relates to high-altitude pseudo satellite control, particularly the control of lift and the protection of the flight envelope.

High Altitude Pseudo-Satellites (HAPS) are fixed wing, heavier than air solar electric aircraft, which operate for months at a time, in the stratosphere. Unlike other high-altitude platforms, e.g. high-altitude balloons, fixed wing HAPS possess an ability to maintain station keeping, a bit like a geostationary satellite, but at only approximately 20 km above the Earth's surface instead of 36,000 km associated with geostationary orbital altitude. When commanded to do so, they can change their 'orbital' location by over 1000 nautical miles in just 24 hrs. They are energy self-sufficient, highly automated, low signature and low vulnerability to enemy action when used in military applications, although HAPS is a dual use technology. They can perform functions which provide new and disruptive capabilities including for example remote sensing or Intelligence, Surveillance and Reconnaissance (ISR), connectivity or Communications Relay (CR), scientific and meteorological services.

The viability of HAPS has been progressively demonstrated: In the late 90's, AeroVironment's Pathfinder planes showed that flight to the stratosphere on solar electric power alone is possible. In 2010, the QinetiQ designed Zephyr 7 prototype achieved a new FAI ratified absolute world record for endurance (14 days) but could not remain in the stratosphere overnight. In 2018 the improved Zephyr 8 HAPS, operated by Airbus Space and Defence, achieved an endurance of over 25 days, critically, staying in the stratosphere, above the weather throughout the flight.

The part of the atmosphere closest to the Earth surface is the troposphere. This is the layer of the atmosphere where virtually all the weather and cloud action occur. Above the troposphere is the stratosphere, and the boundary between the troposphere and the stratosphere is called the tropopause. The troposphere extends from sea-level up to about 55 kft over the tropics, up to 40 kft above the mid latitude areas, and up to about 25 kft over the poles. The stratosphere takes its name from the "stratified" layers of air that exist within it and is characterised by extremely little vertical air movement and mixing. The stratosphere is a very calm and benign environment for aviation. This is in stark contrast with the often-turbulent conditions associated with strong convection systems and large vertical movements of air in the troposphere.

To achieve persistent flight using solar electric power and energy stored in rechargeable batteries over-night, aircraft must fly extremely slowly to minimise power required to cruise. This makes them vulnerable to turbulence e.g. convection and strong winds e.g. the jet stream, so much so that such aircraft can only operate in the troposphere during very benign conditions, which are typically short lived, rendering such an aircraft unable to fly for long durations in the troposphere. The only part of the atmosphere where such aircraft can operate for exceptionally long duration without encountering hazardous turbulence is the stratosphere. Particularly violent weather events in the troposphere can propagate upwards to cause strong winds and turbulence in the lower stratosphere and an optimum altitude exists for which wind and turbulence is at a local minima with respect to altitude and this is about 65 kft (actually this is between 55 kft and 70 kft) for most locations and different times of year above the earth.

It is only possible to achieve the necessary system level of performance to cruise day and night at approximately 65 kft through designing aircraft with exceptionally low wing loading and extremely low power required to cruise in the stratosphere. This enables such aircraft to positively close the delicate "energy budget" for day and night operations in the stratosphere. Analogous to an accountant's financial budget of money in and money out, the energy budget is the total energy into the system as collected through the solar array and added to energy stored in rechargeable batteries, up to their maximum capacity, which must equal or exceed the total out going energy required to cruise all night at the desired stratospheric altitude, while also operating all necessary airborne systems and payloads. A further demand on the minimisation of power required to cruise is the length of the night relative to the length of day. A positive energy budget is clearly much more readily achieved at high latitude in summer, where the days are long, and the nights are short. In contrast at high latitude in winter, the long nights determine a minimum required battery capacity and specific energy density necessary to achieve continuous stratospheric operation year-round over the latitude range of interest.

To date, no fixed wing HAPS system has demonstrated year-round operation at any latitude. A few systems, most notably the airbus Zephyr system, are probably capable of year-round operation near the equator using current battery technology. Almost all other candidate fixed wing HAPS systems are either too heavy, fly too fast and as such, generate too much drag to achieve the necessarily low power to cruise and need a much higher specific energy density battery than is currently available.

With the priority in the design of fixed wing HAPS being to minimise power required to cruise, to enable year round operations in the stratosphere, existing ultra-light weight design method has produced very efficient aircraft which can perform well in the stratosphere, but which are unacceptably vulnerable to turbulence in the troposphere. Small scale, unforecastable convective effects are the source of the type of turbulence large span, low wing loading aircraft are most susceptible to. There are many examples of HAPS which have crashed due to encountering tropospheric turbulence at a resolvable level which is not forecastable. Examples include:

Australian Transport Safety Bureau (ATSB) Investigation number: AO-2019-056 "In-flight break-up involving Airbus Zephyr unmanned aerial vehicle, near Wyndham Airport, Western Australia, on 28 Sep. 2019".

National Transportation Safety Board (NTSB) Accident Number: DCA16CA197 Facebook Aquila Crash Jun. 28, 2016.

National Transportation Safety Board (NTSB) Accident Number: DCA15CA117 Titan Aerospace Solara 50 Crash May 1, 2015.

On Jun. 26, 2003, AeroVironment's Helios was destroyed after the aircraft encountered turbulence and morphed into an unexpected, persistent, high dihedral configuration. As a result of the persistent high dihedral, the aircraft became unstable in a very divergent pitch mode in which the airspeed excursions from the nominal flight speed about doubled every cycle of the oscillation, ultimately exceeding the aircraft's design airspeed.

The existing design approach for fixed wing HAPS has highlighted several fundamental vulnerabilities and limitations which are preventing commercialisation: vulnerability to tropospheric gusts; extremely limited Launch & Recovery (L&R) envelope; high platform cost due to structural complexity to keep weight & drag down, high operating cost due to low availability from short L&R window, unacceptably high tropospheric loss rate when climbing to, or from, the stratosphere.

To cruise all night on only energy stored in rechargeable batteries, HAPS use span loaded, light weight, low wing loading aerostructures, flying at exceptionally low Equivalent Air Speed (EAS). Their weakness is that they are vulnerable to gusts, and this vulnerability becomes worse the bigger the span of the aircraft, this is the problem which is holding HAPS back from becoming operational. Convective, small scale (unforecastable) tropospheric gusts which fixed wing HAPS can encounter during launch and ascent to the stratosphere and similarly during descent for recovery are responsible for high loss rate and low occurrence rate of viable launch or recovery opportunities.

No organisation to date has successfully designed a sufficiently simple low cost, solar powered aircraft which, critically, is performant in the stratosphere for year-round missions, and has the necessary flight envelope and flight control authority to deliver acceptable L&R performance and low loss rate in the troposphere.

In the design of typical aircraft, the size of the aircraft is determined by the required payload mass, typically with a fuselage accommodating the bulk of the mass in the centre of the wingspan; the heavier the payload, the larger the necessary wingspan. The bending loads experienced by the structure increase proportionately with approximately the square of the wingspan. For such designs, there exist a generalised relationship which sees total airframe structural weight growing with a cubic law with wingspan [H. Tennekes. The Simple Science of Flight—From Insects to Jumbo Jets. MIT Press, Cambridge, Massachusetts, USA, 1992] and [André Noth. Design of Solar Powered Airplanes for Continuous Flight, Ingénieuren Microtechnique, Ecole Polytechnique Fédérale de Lausanne, Suisse]. Thus, driving the requirement for ever stronger, stiffer, and lightweight materials to permit a viable aircraft design and places high minimum thresholds on energy density of the fuel and efficiency of the propulsion system to achieve necessary cruise endurance, e.g. commercial jets require the energy density of aviation gasoline (between 43 and 48 MJ/kg which is approximately 12- to 13 kWhr/kg) to deliver 12+hr cruise duration over a long haul flight.

In persistent, regenerative fixed-wing solar-electric flight, the necessary cruise endurance is the length of the night, the duration which must be sustained on battery power alone, before being "refuelled" the following morning by solar derived electrical power. The specific energy density (Whrs/kg) of current state of the art lithium ion batteries is at least 25 times less than aviation gasoline at between 400 and 500 Whrs/kg). This means that for HAPS power required for cruising at the desired altitude must be extremely low and can only be achieved with minimal mass and fly very slowly. "Span loading" distributes the mass of the aircraft's systems and payload evenly across the wingspan of the aircraft and reduces the bending forces necessary to be transferred through the structure, permitting ultra-light weight structures where bending forces no-longer increase with span squared. HAPS must fly as slow as possible to minimize power to cruise (since drag is proportional to speed squared).

The concept of span loaded aircraft design was proposed in 1920. GB172980 introduces the concept of "a constant specific surface load", accompanied by a set of design principles describing the methodology of designing a span loaded structure where the mass of the aircraft would not rapidly increase with span and which, in theory, made it possible to increase the wing aspect ratio up to any desired value. In the example, the inventor presented a configuration of a "giant aircraft" with extremely high wing aspect ratio, which used multiple distributed fuselages fitted with elevators and rudders to control pitch, roll, and yaw. The invention also included distributed propulsion systems and landing gear to evenly distribute the loads along the total wingspan. It is claimed that such an arrangement would minimize bending and torsion deformations and provide the desired wing aspect ratio. The inventor does not discuss in-flight loads produced by turbulence and as described in the invention; such aerodynamic disturbances would likely provoke destruction of the aircraft.

There are many examples of span-loaded, fixed-wing, solar-electric aircraft designed to fly in the stratosphere, some examples among others include:

AeroVironment PathFinder aircraft
AeroVironment Helios aircraft.
QinetiQ Zephyr 6.
QinetiQ Zephyr 7.
Titan Aerospace Solara 50.
Facebook Aquila.
Airbus Zephyr 8.
Bae Systems Phasa 35.
Astigan
HAPS Mobile Hawk 30.
Aurora Flight Sciences Odysseus.
UAVOS Apus Duo.

The designers of the UAVOS Apus Duo have clearly articulated an understanding of the vulnerability that turbulence poses to span loaded aircraft. Their solution presented in patent US2020086972A1 describes a method of controlling span loaded aeroelastic aircraft through varying the angle of attack along portions of the wing using a minimum of three fuselages fitted with elevators to impart the necessary local torsion into the wing to produce the necessary reaction of the wing through local pitch change and hence also a local change in angle of attack. Using this approach, the aircraft according to this invention proposes controlling the shape of the wing to achieve the optimum shape for each phase of flight and to counteract the distortion of the wing on encountering gusts. The invention extends the concept to multiple wing aircraft in which the trailing edge of the wing is actuated to produce the necessary change in coefficient of lift to produce the desired correction to a wing shape error or deviation from the considered optimum shape for the phase of flight. The proposed optimum mode of implementation of the invention is described as a multiple wing in which a staggered biplane arrangement is used with the two wings connected with three (or more) fuselages utilising trailing edge actuators to alter the coefficient of lift along a local region of the wing. This is in effect wing warping as originally proposed in 1906 by U.S. Pat. No. 821,393A Flying Machine but applied to the modern application of HAPS span loaded aircraft.

The above referenced UAVOS patent US2020086972A1 uses torsion along the sections of the wing to change the local angle of attack to control bank and "V-shape". However, the increase of induced drag caused by having multiple wings, this makes the positive closure of the energy budget in the stratosphere more challenging and requires an improvement on battery specific energy density to achieve performant flight in the stratosphere. This constitutes a significant mass and efficiency penalty, which must be carried all the time in the majority benign conditions of stratospheric flight, just to reduce vulnerability to turbulence during transient encounters in the launch and recovery phases associated with tropospheric flight.

Another type of gust alleviation solution for span loaded HAPS is described in 'Aeroelastic dynamic response of elastic aircraft with consideration of two-dimensional discrete gust excitation' [Chao YANG, Zhigang W U, School of Aeronautic Science and Engineering, Beihang University, Beijing 100083, China, 14 Dec. 2018]. This study focused on a span loaded HAPS, with large 50 m span wing, using one fuselage fitted with elevator to control speed, and used a system of 4 ailerons along the span of the wing to implement a gust alleviation control system. The ailerons are used to change the span wise lift load distribution to control the response of the aeroelastic wing to different gust profiles and limit the maximum wing root bending loads and centroid acceleration experienced when exposed to gusts. The analysis showed a significant reduction in loads experienced by the airframe using the active gust alleviation control through ailerons. Ailerons are a simple control actuation system for conventional aircraft, but carry a number of limitations in the context of use on highly aeroelastic span loaded aircraft: one issue with ailerons for roll control or span wise shape control on a HAPS, is the drag on the down going aileron generates a yawing moment in the adverse sense, in that it generates a yaw rate of opposite sense to that required for a coordinated turn. A further, more serious, issue with use of ailerons, particularly for their use on aeroelastic HAPS, is that control deflection generates significant pitching moment, which tends to twist the wing in the opposite sense to the deflection of the control. In the first instance this leads to a reduction in aileron effectiveness, moreover with slender wings and especially at relatively high-speed flight, this may lead to control reversal. Additional torsional stiffness in the design of the wing but with the penalty of higher aero-structural mass, can counter or prevent this effect. The Chao Yang study did not assess the penalty caused by the mass of the ailerons and the proposed solution was not analysed or optimised for minimising aero-structural mass fraction to maximise performance in the stratosphere.

The object of the present invention is maintenance of aerodynamic derivatives and to provide flight envelope protection through dynamic control of lift distribution on low wing loading, high aspect ratio, solar powered fixed wing High-Altitude Pseudo Satellites while minimising any increase in weight, drag and/or pitching moment According to the present invention, there is provided a High Altitude Pseudo Satellite (HAPS) aircraft according to claim 1. According to other aspects of the present invention, there are provided methods for controlling the flight of a High Altitude Pseudo Satellite (HAPS) according to claim 7 or to claim 11.

The invention will now be described, by way of example, with reference to the drawings, of which FIG. 1 is a front elevation and plan view of a HAPS aircraft according to an embodiment of the invention;

FIG. 5 depicts the process for flight envelope protection—Spanwise Shape Control;

FIG. 6 depicts the process for flight envelope protection—Speed or Roll Control;

The premise of the invention is a new gust alleviation control system for maintaining desired aerodynamic derivatives for high aspect ratio and low wing loading (specifically, an aspect ratio greater than 15 and wing loading less than 6 kg/m$^2$), fixed wing HAPS and is based on actively controlling the span wise lift distribution during turbulence, using a system of distributed spoilers, which are used to maintain or change the span wise shape of an aeroelastic structure, and control speed and wing torsion when combined with a system of one or more fuselages with supporting elevators.

Figure 1:
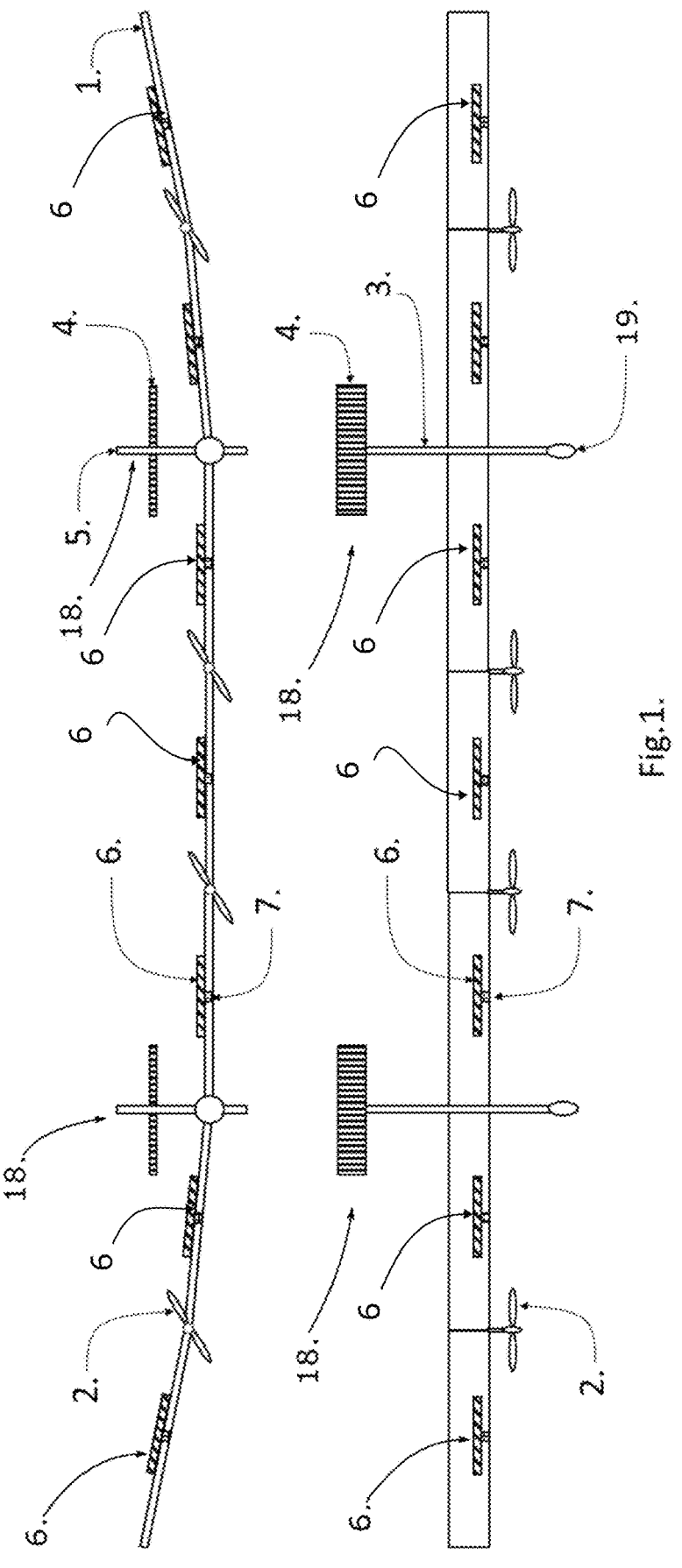

An example of the invention is depicted in FIG. 1. which presents a span loaded HAPS wing 1 supporting a distributed avionics and power generation and storage system. The HAPS wing 1 has a distributed propulsion system 2 for generation of thrust in cruise, climb, and when multiple propulsion systems are used, has the potential to generate differential thrust to augment flight control and navigation. The HAPS wing 1 has one or more fuselages 3 with attached elevator(s) 4 to control pitch, speed, and total torsion in the wing. A single tail can be used, or multiple tails 18 used as shown here to minimise total exposed torsion to within the ultimate torsion limit of the aerostructure, or to provide increased speed envelop, or permit the use of a lighter weight structure which is less stiff in torsion. Each fuselage 3 also supports a vertical fin and rudder 5 to provide lateral stability and augment yaw and roll control.

The main feature of this aircraft is that the span loaded wing 1 is also fitted with a distributed system of spoilers 6, which are located near the aerodynamic centre of pressure, so that when deployed, they achieve a lift modification with minimum effect on wing pitching moment and longitudinal stability. This is as opposed to trailing edge devices, which for example, impart a torsion and pitching moment into the wing. The spoilers 6 are used to modify the spanwise lift distribution to protect the aerostructure when encountering turbulence. They are used in conjunction with a distributed system of attitude sensors 7, which are installed near each spoiler and which allow the spoilers to be used to maintain aircraft stability and speed range through maintaining the span wise shape of the aircraft. Local Angle of Attack (AoA), Yaw and Airspeed are measured using a local air data probe 19 installed near the front of each fuselage.

Figure 2B:
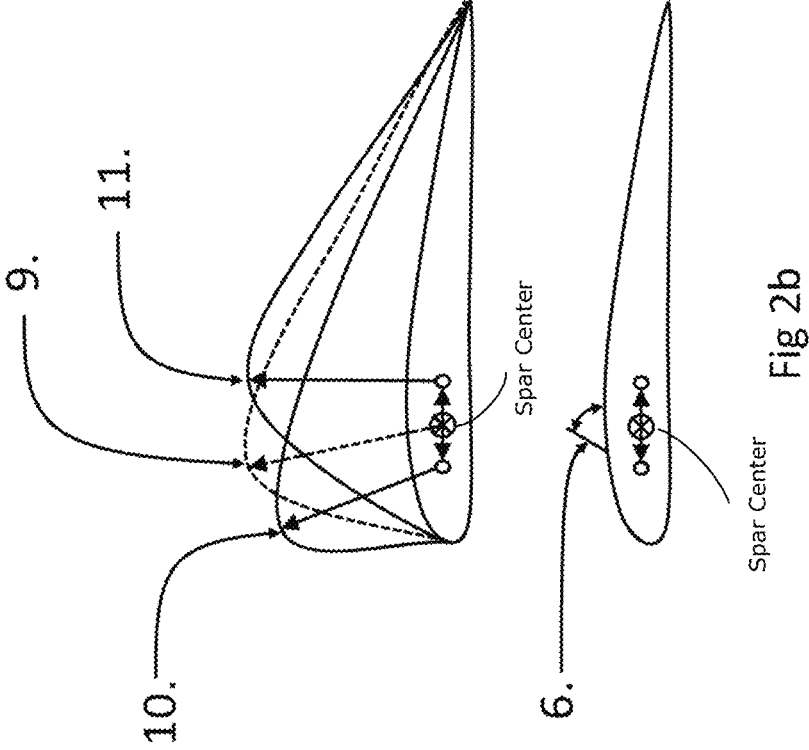
FIGS. 2a and 2b are a lateral sections of the wing of the HAPS aircraft
Figure 2A:
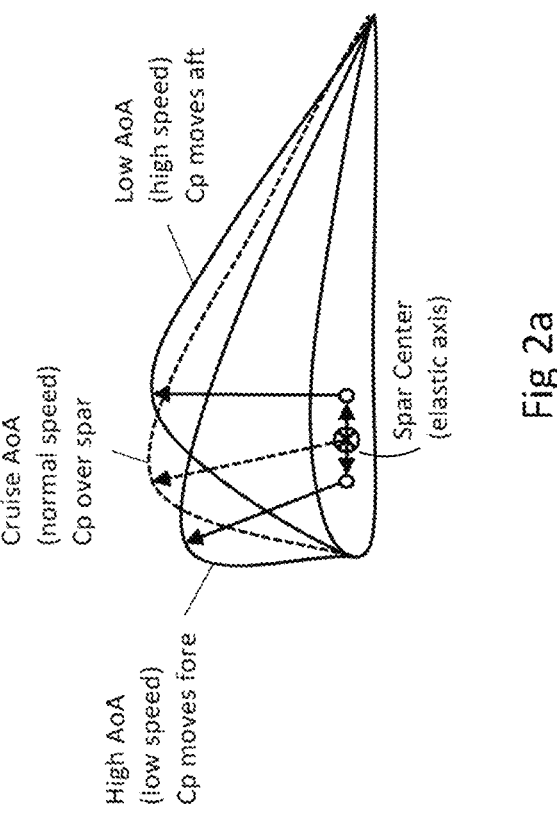

Referring to FIG. 2a and FIG. 2b, a typical chord wise lift distribution on the upper surface of an example aerofoil section of the wing 1, illustrated schematically is the lift distribution 9 in cruise with associated centre of pressure 8. Also depicted is the change in chord wise lift distribution 10 for slower speeds, or higher AoA where the centre of pressure moves 8 forward, and similarly lift distribution 11 for higher speeds, or lower AoA, the centre of pressure moves 9 rearwards. Of particular interest is the high-speed case where the movement of the centre of pressure rearwards inputs a chord wise torsion which pitches the wing downwards. In large wingspan aircraft especially highly flexible structures, the compounding torsional deflections lead to change in lift distribution, possibly negative lift at tips which can be divergent and result in structural failure or 'tuck under'. Even if divergent failure does not occur, a likely reduction in dihedral shape of the wing 1 can contribute to a loss of roll stability and control, increasing the likelihood of further turbulence causing a departure from the flight envelope.

The approximate location of the spoiler 6 on the wing 1 is also indicated in FIG. 2, this should be located on or near the centre of pressure in cruise. Activation of this spoiler in the overspeed case can alleviate the pitching moment to assist in speed control, reducing torsion and restore the correct dihedral shape of the aircraft. The spar center (elastic axis) is located in the front half of the wing.

The spoiler 6 itself can be a front hinged spoiler type or fence spoiler, with exact dimensions specific to the implementation on the selected aerofoil(s), wingspan and aeroelasticity of the design solution. Actuation is through an electromechanical servo causing the spoiler to pivot along arrow a.

The aircraft employing this system is scalable with span in accordance with the principles of span loaded design, that is to maintain total bending loads and torsion loads over the entire flight envelope, as well as permitted gust envelope, to within the specification of the aero-structural limits. In this way, a smaller span HAPS aircraft using distributed spoilers to control spanwise shape, could be designed with just one fuselage and elevator to control pitch and speed, while maintaining the aerostructure within its torsion envelope. A larger span aircraft might require two or more fuselages with elevators to limit the total exposed torsion along the wingspan. When turbulence is encountered, the spoilers are used to maintain span wise shape and alleviate torsion build up due to excessive high, or low, speeds. Maintaining the designed span wise shape in turn maintains stability in flight control and flight control authority, while the elevators maintain local angle of attack and ultimately control the speed of the HAPS.

The aircraft offers an exceptionally light weight, simple and efficient sensing, and actuation system, to protect the shape of the aircraft when turbulence or gusts are encountered. Controlling the spanwise shape of the HAPS wing to the optimum shape, ensures the design's intended stability characteristics and flight control authority is always present. If the shape is not maintained during turbulence or on encountering a gust, and the span wise shape were to deform into a less aerodynamically stable shape, then the result is likely to be insufficient flight control authority to prevent or limit the build-up of speed, or excessive roll angle. This would ultimately cause catastrophic departure from the flight envelope and structural failure in flight. The mass and simplicity of the spanwise lift modification system, based on spoilers, is an important aspect of the innovation. Since the purpose of this configuration is to protect the HAPS aircraft during exposure to turbulence, without forcing the aircraft to carry a significant weight, drag or complexity penalty throughout all other phases of flight. The stratosphere is in general a very benign environment and this aircraft ensures the system level efficiency is not compromised under such calm conditions i.e. the spoilers are only used to save the aircraft from severe turbulence effects most likely encountered in the troposphere during ascent to the stratosphere or during descent for recovery.

The configuration can be considered a flight envelope protection system for fixed wing HAPS, activating when the absolute attitude of the aircraft e.g. conventional angle of bank, or speed, exceed a given threshold for the design, or if the relative attitudes of sections of wing deviate beyond a specified threshold e.g. the combinations of bending loads and torsional loads resulting from flight envelope manoeuvres or environmental turbulence, result in the shape of the wing deviating from the idealised shape by more than a predefined threshold.

Figure 3:
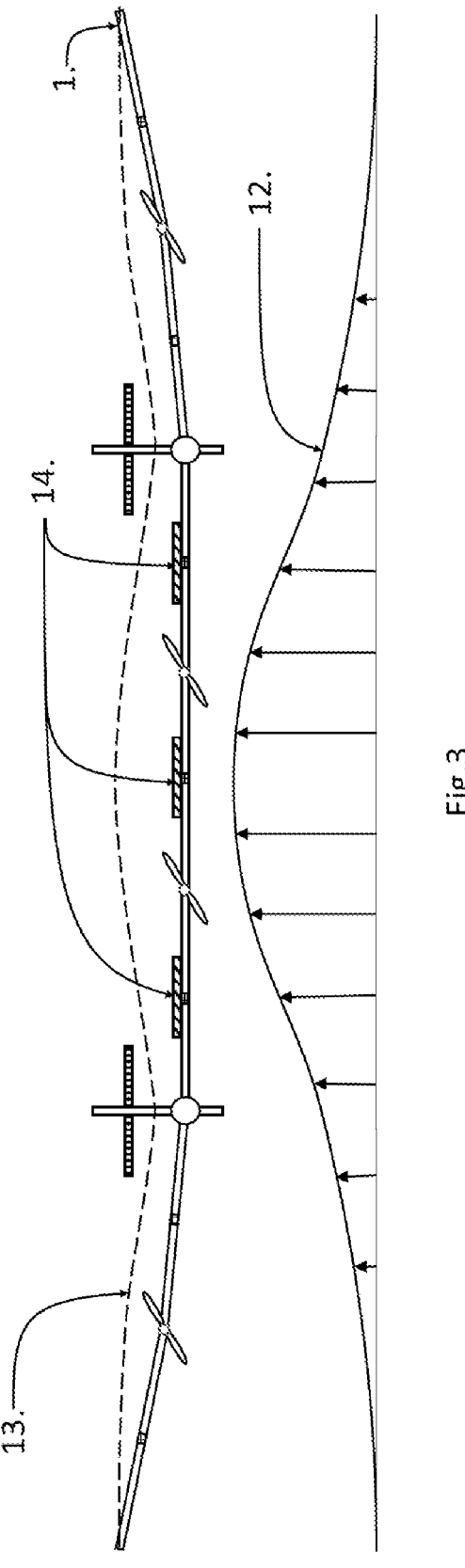
FIG. 3 is a front elevation view of a HAPS aircraft with an example of an incoming air velocity field.

To further explain the function of the spoiler configuration of the aircraft, FIG. 3. depicts an incoming air velocity field 12, as might be associated with a thermal dead ahead of the aircraft and with dimensions approximately equal to or less than the span of the aircraft. Without the spoiler actuated gust alleviation system, the fixed wing HAPS 1 would encounter a higher AoA and increased lift associated with the rising air affecting the centre of the aircraft, this would cause the wing to deform into the shape depicted by the dotted line 13, with lower dihedral and a significant departure from the idealised shape. Instead, the gust alleviation system senses the commencement of wing deformation and activates the spoilers in the centre of the wing 14, and which modify the span wise lift distribution to counter the effect of the air velocity field and preventing excessive deformation during the encounter and limit the maximum bending loads at critical points. The shape of the aircraft and thus lateral stability modes are maintained through reducing lift in the centre of the wing.

Figure 4:
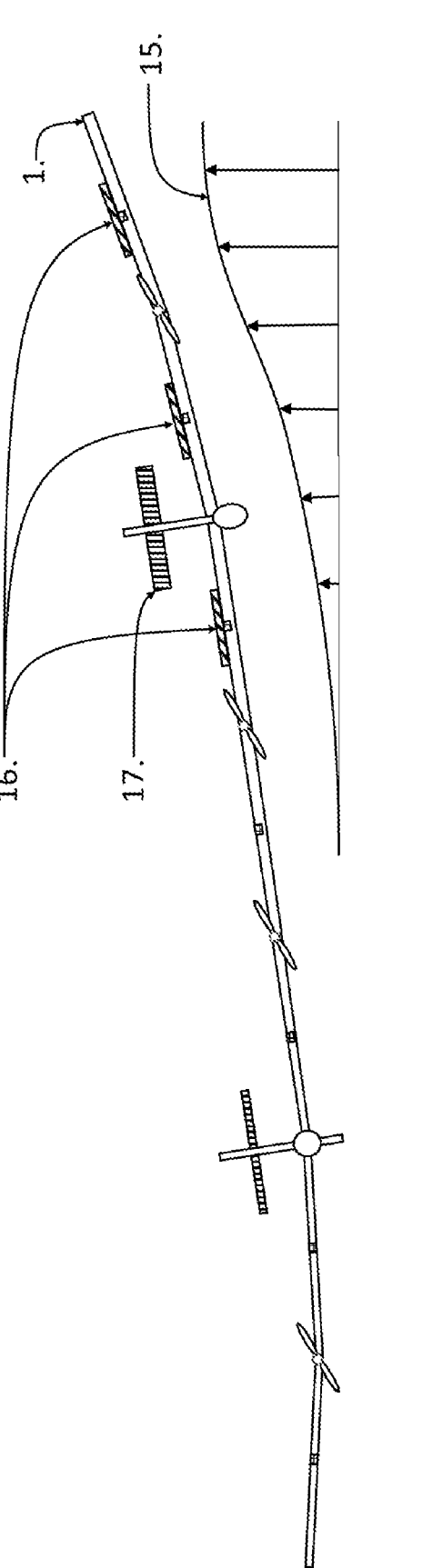
FIG. 4 is a front elevation view of a HAPS aircraft with an example of a different incoming air velocity field.

In the case of asymmetric gusts, FIG. 4. illustrates an approaching gust velocity field 15. presenting raising air such as a thermal, but which only affects the port wing 16. In this scenario, the port wing experiences a higher AoA and increased lift associated with the rising air causing the port wing to lift, invoking a bank to the right and in the case of flexible large span HAPS, deforming the aerostructure into adopting more dihedral and causing both bending and torsional loads in the structure to increase. The gust alleviation system responds by having detected the building errors in roll and span shape as reported by the distributed system of pitch and roll sensors and through a Proportional, Integral and Differential (PID) control loop, activates the spoilers appropriately, in this case, those on the port wing 16. Port wing spoiler activation serves to reduce local lift, resisting the rolling moment caused by the gust. The port fuselage elevator 17. responds to the local increase in AoA through its PID control loop with elevator actuation to reduce torsion in the wing and maintain the demanded AoA and therefore also maintain speed.

Referring to FIG. 5. in summary the process of gust alleviation comprises the steps of taking measurements 20 from the sensors, using this data to determine the amount of deformation (or predicted deformation), for example by calculating 22 an error value from the optimal wing shape. When this error value exceeds some threshold value or values, the spoilers are activated to compensate for this and bring the wing shape back within the acceptable profile. Different spoilers may be activated to different degrees in a co-ordinated manner, depending on the distribution of the error values along the wingspan. This process is continual, so that the spoiler activation is responds as forces on the wing that would deform it change, until no longer required.

Functionally the invention is a flight envelope protection system which maintains the desired aerodynamic derivatives set optimal for the phase of flight in question. When implemented optimally, the spoilers should not activate when performing normal navigational manoeuvres during flight in calm conditions in the stratosphere. It is permissible, but undesirable to use the spoiler system during routine banking manoeuvres, since they present significant drag in contrast to rudder or differential thrust only actuation and the spoilers represent excessive roll control authority in calm conditions. Their purpose is to correct span wise shape errors, roll errors and speed errors resulting from environmental disturbances and remain undeployed when not required. The threshold for activation is determined specifically for each aircraft design and is based on the definition of the normal manoeuvre envelope and aircraft span wise shape used in calm conditions, relative to thresholds in speed error, roll error and shape error for which there is a statistically acceptable drag penalty during flight in mild turbulence (this is analogous to an acceptable false alarm rate), contrasted with the critical bending and torsional thresholds for which structural failure will occur. When flying at its overnight stratospheric altitude, when energy constraints are most acute, the optimum implementation will typically be one in which the spoiler gust alleviation system only actuates when passing through hazardous turbulence.

Referring to FIG. 6. the process for errors in speed or roll control is similar to that for gust alleviation, and comprises the steps of taking measurements 25 from the HAPS sensors, and comparing the measured states with the flight control system speed and roll demands to determine speed and roll error. When this error value exceeds some threshold value or values, the spoilers are activated to reduce the speed and roll error. Generally, the normal flight control system actuators e.g. elevator, rudder and sometimes differential thrust if available, will be actuated to correct speed and roll errors, however the control can be supplemented using this system when it is clear the system is entering a hazardous state.

The spoilers in this system are used in a distributed manner across the entire span of the wing to not only support roll control, but to maintain stability through controlling the span wise shape of the wing, without imparting significant pitch moment or chord wise torsion.

There is an alternative mode of operation offered by the configuration described here which is of benefit to the operation of fixed wing HAPS. During the descent phase of a mission, it is advantageous to descend as fast as possible from the stratosphere. This is to minimise duration of exposure to potential turbulence in the troposphere, but also the potential downwind drift distance resulting from descent through the Jetstream or other strong wind layers in which the aircraft's True Air Speed (TAS) is less than the wind speed at the altitude in question. In the descent phase, efficient low drag flight only serves to extend the duration of the descent and so it is advantageous to use the distributed system of spoilers to speed up the rate of descent through deliberate increase in drag and/or speed, this operating mode is referred to as the rapid descent mode. In the rapid descent mode, all or almost all spoilers are initially deployed, maximising drag to maximise rate of descent while maintaining operation within the normal speed envelope. In this condition, to combat hazardous turbulence, shape errors are corrected by actuating the reduction in spoiler deployment and hence local increase in lift generation as the restoring force acting to reduce the span wise shape error. This is the exact opposite to normal operation of the spoiler actuated gust alleviation system during climbing or cruising phases where minimising drag is a priority and spoilers are retracted most of the time, deploying only to reduce local lift.

Figure 7:
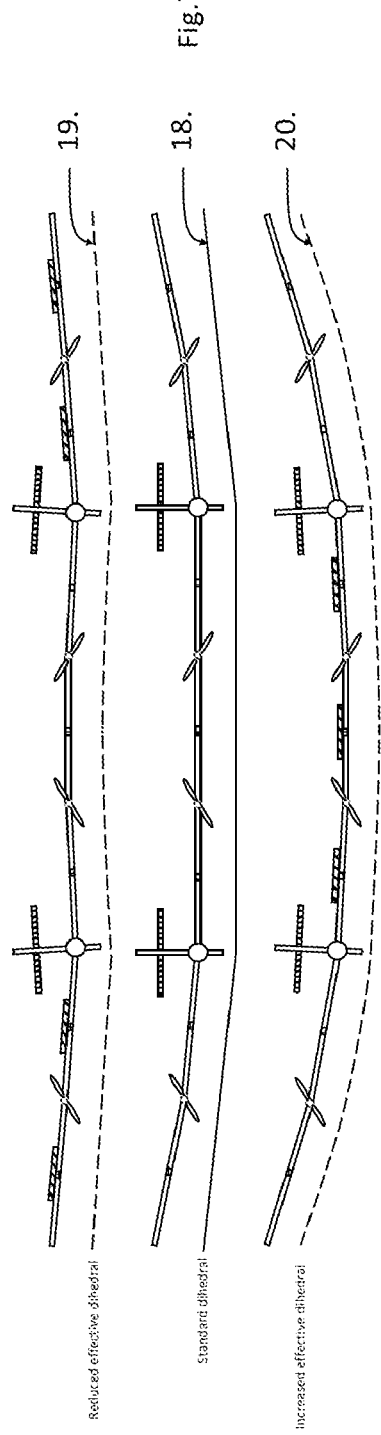
FIG. 7 is a front elevation view of a HAPS aircraft with three examples of different span wise shapes representing different desirable dihedral conditions for different phases of flight.
Figure 8:
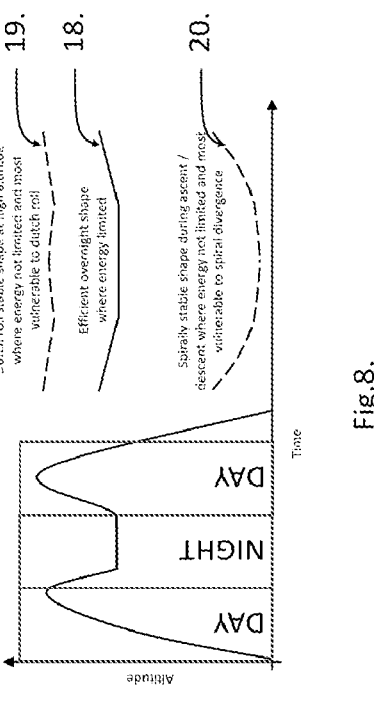
FIG. 8 presents HAPS use case examples for selecting optimal dihedral shape demand as a function of operating altitude.

FIG. 7 and FIG. 8 depict the standard (optimal) implementation of the invention with spoilers not deployed 18 during normal manoeuvres while cruising in the stratosphere. At very high altitude, typically above the intended normal over night cruise height for the HAPS, the standard dihedral shape resulting in the baseline aerodynamic derivatives may present too much roll stability resulting in the risk of oscillatory modes such as Dutch roll, making climb and flight at higher cruise altitudes hazardous or non-optimal for certain imaging payloads. The distributed system of spoilers can be set to reduce lift on the outboard wing sections having the effect of reducing the dihedral and reducing roll stability to avoid oscillatory modes 19. Conversely, during climb or descent through the troposphere, where greater roll authority is advantageous in mitigating hazardous turbulence, spoilers in the centre of the wing reduce lift to promote flight with increased dihedral and greater spiral stability 20.

The highly flexible nature of the HAPS wing therefore permits different wing profiles to be adopted, which is not possible in convention fixed wing aircraft having relatively stiff wings. When the measurement of the amount of deformation (or predicted deformation) or other similar value is calculated from the sensed data, for example an error value from the optimal wing shape, the optimal wing shape may change depending on the altitude, manoeuvres to be carried out, efficiency desired, and so on. Several different optimal wing shape profiles may be stored and selected for particular environmental criteria and/or intended manoeuvres. Alternatively, the optimal wing shape at a particular time can be calculated according to the particular environmental criteria and/or intended manoeuvres, that is, the optimal wing shape may be selected or calculated in a scheduled manner, such as when a change in altitude is required, or by energy constraints (such as night-time flying when solar charging is unavailable), or in a reactive manner, such as when turbulence is encountered and it is desirable for the wing shape to adopt a more stable but less energy efficient profile.

This system adds minimal control surface mass and does not impart a significant pitching moment or chordwise torsion into the wing structure during activation. Such a system would support minimising total aero-structural mass by permitting the use of highly flexible, span loaded structures, with extremely low bending strength and exceptionally low torsional stiffness. Such a system would permit an extremely light weight span loaded aircraft, robust to the effects of turbulence but able to maximise performance in the stratosphere. This would ensure the delicate day-night energy budget can be positively closed on existing battery technology, or performance enhancements from future battery technology can be used to provide more power to the payload or project the capability to even higher latitudes in winter months.

Though the use of spoilers reduces lift and increases drag so that continual use during cruise in the stratosphere would represent an undesirable inefficiency, the use of a distributed system of spoilers is an advantageous solution to mitigating catastrophic turbulence, and such hazardous turbulence is typically short lived and transient, normally only associated with tropospheric flight. The priority in the solution to mitigating turbulence on a span loaded wing is therefore to minimise mass in the implementation of the actuation system and supporting aerostructure needed to give the aircraft extra-control authority when encountering hazardous turbulence. In this regard, a spoiler located on or near the centre of pressure achieves minimal additive aero-structural mass, since its activation imparts little or no torsion into the wing and it can be used with other spanwise located spoilers to modify the entire span wise lift distribution in a particularly mass effective way. During flight in calm conditions or mild turbulence, e.g. stratospheric flight, the spoilers are not routinely used for normal navigational manoeuvres and so do not contribute significant additional drag.

During flight in the troposphere either climbing or descending, when energy budgets are far less restricted, the distributed system of spoilers can be used to modify the lift distribution to deliberately increase banding load to enhance dihedral and increase spiral stability, pre-emptively of encountering gusts which are potentially unforecastable. During daytime once the battery storage system is full and when there is typically excess electric power generation, this can be stored as gravitational potential energy prior to night fall, by climbing higher in the stratosphere. The system of spoilers can be used to reduce dihedral to create a Dutch-roll stable shape at high altitude.

As previously described, the system of distributed spoilers can also be operated to deliberately increase drag and permit a rapid descent mode. This is to allow recovery of HAPS while minimising tropospheric exposure time to turbulence or downwind drift conditions when passing through strong wind layers. A further benefit of deploying all spoilers to reduce lift is during ground handling associated with taxing and launch process to reduce susceptibility to hazardous gusts lifting the structure prematurely and results in a wider operating envelope for ground handling.

The aircraft uses multiple span distributed spoilers and attitude sensors with one or more fuselages and associated elevators and permits control of bending and torsional forces resulting from gusts and turbulence, through modification of the span wise lift distribution for the maintenance of the desired spanwise shape and to provide high control authority to reduce hazardous roll errors or speed errors. The use of this configuration in the design and operation of fixed wing HAPS enables:

Expansion of the operating envelope of HAPS to permit statistically more launch and recovery opportunities than systems not equipped with this technology.

Lower loss rate due to catastrophic aero-structural failure resulting from un-forecast turbulence encounters.

Designers of HAPS can further reduce the airframe mass fraction of fixed wing HAPS through extremely light weight span loaded airframe which can be highly flexible in bending and torsion.

Lower airframe mass fraction can allow a smaller span aircraft which is less vulnerable to gusts, to carry a larger mass payload, which would normally only be possible from a larger span, more gust vulnerable aircraft.

In the rapid descent mode with all spoilers deployed, increase in rate of descent is variable based on specific aircraft factors. The predicted improvement in reducing tropospheric exposure time is up to a factor of 10. For example, in the case of an efficient HAPS able to cruise year-round on current battery technology in the stratosphere, the descent time from 60 kft, without a rapid descent mode, is about 20 hrs. This configuration applied to a HAPS can reduce this to approximately 2- to 3 hrs. Some existing HAPS aircraft have demonstrated descent from the stratosphere in less than 6 hrs without a rapid descent mode, however, this is a reflection of their poor system level efficiency and higher wing loading in that such aircraft can't sustain stratospheric flight, day and night, outside of summer conditions where days are long and nights are short and do not represent commercially viable HAPS systems.

The system as described above relies on attitude sensors to detect deformation of the wing, whereupon the spoilers are activated to locally reduce lift and maintain an acceptable wing shape. However, it will be realised that other quantities could be used instead of or in addition to attitude in order to determine the lift or deformation, such as strain gauges, air pressure etc.

The invention claimed is:

1. A flight control system capable of restoring flight control authority and desired wing shape for fixed wing High Altitude Pseudo Satellite (HAPS) aircraft comprising:

at least one aeroelastic fixed wing that is span loaded when flying, an aspect ratio greater than 15 and wing loading less than 6 kg/m$^2$;

the at least one aeroelastic fixed wing having a plurality of spoilers distributed across the span of the at least one aeroelastic fixed wing, each spoiler being chordwise located approximately above an aerodynamic center and elastic or torsional axis of the at least one aeroelastic fixed wing such that there is no substantial effect on wing pitching moment and longitudinal stability resulting from their actuation and above or near a torsional elastic axis of the at least one aeroelastic fixed wing, such that there is no substantial effect on wing pitching moment and longitudinal stability;

a control system for controlling the spoilers;

a spanwise distributed system of attitude sensors which measure the pitch and roll at points or regions along the wing span so as to allow determination of wing shape, rate of change of wing shape and its degree of deformation from a pre-defined shape;

the spoiler being activatable with no substantial effect on wing pitching moment, to modify the spanwise lift distribution to either maintain or reduce the divergence from the pre-defined wing shape in response to the quantities determined by the control system.

2. The flight control system capable of restoring flight control authority and desired wing shape for fixed wing HAPS aircraft according to claim 1 wherein the spanwise distributed system of attitude sensors and the control system detects relative differences in lift and/or pitch and/or roll and/or bending and torsional strain along the wingspan which cause the wing to deform, or indicate that the wing has deformed from a pre-defined shape of the at least one wing, and activates one or more particular spoilers to reduce elevated lift at points or regions and either maintain or reduce the divergence from the pre-defined wing shape.

3. The flight control system capable of restoring flight control authority and desired wing shape for fixed wing HAPS aircraft according to claim 2 wherein more than one pre-defined wing shape is stored, and selected according to particular environmental criteria and/or intended maneuvers.

4. The flight control system capable of restoring flight control authority and desired wing shape for fixed wing HAPS aircraft according to claim 1 wherein the spanwise distributed system of attitude sensors and control system detect hazardous errors in the speed or roll angle of the at least one aeroelastic fixed wing and activate a particular spoiler or plurality of spoilers to reduce the speed or the error of roll angle of the wing.

5. The flight control system capable of restoring flight control authority and desired wing shape for fixed wing HAPS aircraft according to claim 1 wherein the control system activates the spoilers to reduce the lift of the HAPS when the HAPS is descending through the troposphere.

6. A method of restoring flight control authority and desired wing shape for fixed wing a High Altitude Pseudo Satellite (HAPS) aircraft, the aircraft having at least one aeroelastic span loaded fixed wing, an aspect ratio greater than 15 and wing loading less than 6 kg/m² and the at least one aeroelastic fixed wing having a plurality of spoilers distributed across the span of the at least one aeroelastic fixed wing, each spoiler being chordwise located approximately above an aerodynamic center and elastic or torsional axis of the at least one aeroelastic fixed wing such that there is no substantial effect on wing pitching moment and longitudinal stability resulting from their actuation and above or near a torsional elastic axis of the at least one aeroelastic fixed wing, such that there is no substantial effect on wing pitching moment and longitudinal stability comprising:

sensing a quantity from which local pitch and roll attitude can be determined by a spanwise distributed system of attitude sensors;

detecting relative differences in the pitch and roll attitude that cause or account for an adverse deformation in a pre-defined wing shape; and activating a spoiler with no substantial effect on wing pitching moment, to modify the spanwise lift distribution to either maintain or reduce the divergence from the pre-defined wing shape so as to reduce or eliminate the deformation that would otherwise occur.

7. The method according to claim 6 wherein more than one pre-defined wing shape is stored or generated, and selected according to particular environmental criteria and/or intended maneuvers.

8. The method according to claim 6 wherein the spoiler is activated incrementally, the amount of activation being proportional to the relative excess lift determined at the point or region of the spoiler.

9. The method according to claim 6 wherein the spoilers are activated to reduce the lift of the HAPS when the HAPS is descending through the troposphere.

10. A method of restoring flight control authority and desired wing shape for fixed wing a High Altitude Pseudo Satellite (HAPS) aircraft, the aircraft having at least one aeroelastic span loaded fixed wing, an aspect ratio greater than 15 and wing loading less than 6 kg/m² comprising:

activating one or more spoilers to reduce the lift of the HAPS when the HAPS is descending through the troposphere, wherein the at least one aeroelastic span loaded fixed wing having a plurality of spoilers distributed across the span of the at least one aeroelastic span loaded fixed wing, each spoiler of the plurality of spoilers being chordwise located approximately above an aerodynamic center and elastic or torsional axis of the at least one aeroelastic span loaded fixed wing such that there is no substantial effect on wing pitching moment and longitudinal stability.

11. The method according to claim 10 further comprising:

sensing a quantity from which lift at points or regions along the wing can be determined;

detecting relative differences in the lift that would cause adverse deformation in the wing shape; and activating a spoiler from the one or more spoilers on the wing proximal to where the relative elevated lift is occurring so as to restore intended stability characteristics and flight control authority.

12. The method according to claim 11 wherein the spoiler is activated incrementally, the amount of activation being proportional to the relative excess lift determined at the point or region of the spoiler.

13. The HAPS aircraft according to claim 1, wherein each spoiler is chordwise located in the front half of the wing towards the leading edge.

14. The HAPS aircraft according to claim 2, wherein more than one optimal wing shape is generated and selected according to particular environmental criteria, intended maneuvers, or both.

15. The HAPS aircraft according to claim 1 wherein the at least one wing comprises a spar center in a front half of the at least one wing and the plurality of spoilers are located above the spar center.

\* \* \* \* \*